Figure 1:
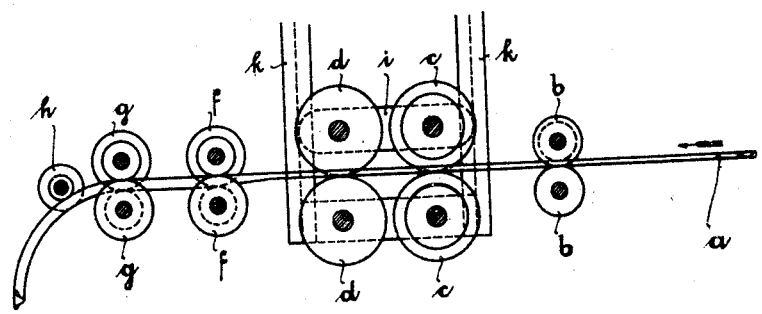

R. KRONENBERG.
METHOD AND MEANS FOR ELECTRICALLY WELDING THE RIMS OR FLANGES OF WHEEL OR CYCLE TIRES.
APPLICATION FILED SEPT. 20, 1917.

1,257,615.

Patented Feb. 26, 1918.

Witnesses:

Inventor
R. Kronenberg
by
Attorney.

UNITED STATES PATENT OFFICE.

RUDOLF KRONENBERG, OF OHLIGS, GERMANY.

METHOD AND MEANS FOR ELECTRICALLY WELDING THE RIMS OR FLANGES OF WHEEL OR CYCLE TIRES.

1,257,615.  Specification of Letters Patent.  Patented Feb. 26, 1918.

Application filed September 20, 1917. Serial No. 192,326.

*To all whom it may concern:*

Be it known that I, Dr. RUDOLF KRONENBERG, general director, subject of the King of Prussia, German Emperor, residing at Ohligs, in the Province of the Rhine, Germany, have invented certain new and useful Improvements in Method and Means for Electrically Welding the Rims or Flanges of Wheel or Cycle Tires, of which the following is a specification, reference being had therein to the accompanying drawing.

My invention relates to an improved method and means for electrically welding the rims or flanges of wheel or cycle-tires, particularly of the Westwood type, which rims, hitherto, have been simultaneously molded by one electrical roller-tool working its pressure on both rims at a time.

I have found, that by such welding of both rims by a single tool the work is not uniformly performed and that the reason of such irregularity is caused by an unequal pressure of the welding roll against the two rims. Such unequal pressure is occasioned by the fact that the two strips or plates of sheet metal to be united by welding sometimes vary in thickness and quality on the two opposite sides on which the tool simultaneously impinges, the said variation occurring particularly after the said strips have been rounded for being united by welding. It will be seen, that the welding tool, on impinging on a part of length somewhat thicker on one rim, than on the opposite part of length, will more closely touch said thicker part than the opposite thinner part. In consequence, the electrical current will not be uniformly distributed on both rims, the inequality may be carried to such degree, that on one side the metal is burned or spoiled, while on the opposite side the thinner parts are scarcely warmed, thus the welding effect becomes useless on both sides of the rim. The inequality will be the greater, if the mechanical pressure of the welding tool works harder against the thicker portion on one side of the rim than on the thinner portion opposite, and, further, small differences in the quality of the material on both sides frequently increased the disparity of the welding performed on both sides of the rim. Even the slightest variations in the thickness and structure of the material will cause variations in the welding obtained, objectionable to the uniformity of the tire, though such deviations, often, will only become apparent after some time of use.

According to my invention, the full uniformity of welding both sides of the rim is obtained by performing the operation on both sides by separate tools, and I prefer to employ two electrical roller tools or electrodes following each other in their traveling course. By this means I avoid any influence of welding one side of the rim on that of the other side, particularly the difference of pressure of the welding tools on both sides, and I avoid all those sources of defect above mentioned and of the evil consequences of such defects; the uniformity of welding is established as fully as practically possible.

A further improvement of this invention consists in changing the mode of operation in welding, profiling and rounding the strips of sheet-steel in manufacturing Westwood-tires. The usual way of proceeding is to weld the flanges to the ready profiled and rounded felly in a separate operation. According to my invention I prefer to perform the whole work to be done, viz: welding, profiling and in case also rounding the flanged strip of sheet steel of the felly in one continuous set of working operations, the series of which is, as indicated, the electrical welding of the flanges being done before profiling them. The advantages of said mode of proceeding will be set forth after describing the invention with reference to the accompanying drawings, in which—

Figure 2:
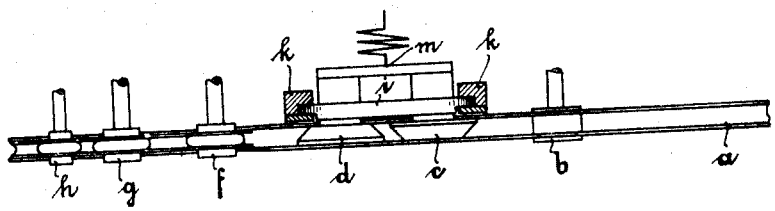

Figure 1 is a side-elevation of the welding tools in the position of operation, and Fig. 2 a plan view thereof.

The flat, flanged strip of sheet-steel $a$ is introduced between the guide-rollers $b$, $b$, one of which, preferably the upper one, is corrugated to better grip the flanges of the strip $a$. The said strip is thus forwarded between the electrode-rollers $c$, $c$ and $d$, $d$ which perform the welding of the flanges of the strip $a$ to the center of said strip. Said strip, then, passes between the molding rollers $f, f$, by which the Westwood profile is produced, after which the strip may be rounded by the rollers $g, g$, which follow immediately after the said molding rollers $f, f$. Driving means are applied to all of these rollers, or at least to those which serve to feed the strip forward.

By placing the welding rollers $c, c$ and $d, d$ in advance of the profiling rollers $f, f$, in the direction of motion, the flanges of the strips to be welded to the main strip $a$ are seized and operated upon while all the surfaces to be united by welding still keep a plane state; welding, thereby, is better performed than if it be done in a curved state. The said advantage is particularly conspicuous with the Westwood profile, as the latter would be impaired by being welded in a curved state on account of the pressure of the rollers. The disadvantage of welding the flanges in a curved state are coherent with all welding methods hitherto known. From the drawings it will become evident, besides, that the welding rollers may be arranged in the best and simplest manner for working in a plane, while it will always be cumbersome to snugly apply them to a curved strip which has been profiled. If it should happen that by the use of the welding rollers the profile be deteriorated, i. e. partly widened or curved, such deformation will be fully repaired by the profiling rollers which, according to my invention, are working after the welding rollers. A further advantage consists in that the final finishing work, cleaning, scrubbing and varnishing, will find no impediments in protruding or projecting parts which may be troublesome to overcome.

By performing the profiling operation immediately after the welding operation in one uninterrupted working train, I obtain the advantage, that the welded strip continues to be held exactly in the position which is fittest for the profiling of the same, and that it is prohibited to become distorted before entering between the profiling rollers. The same advantages are obtained by rounding the tire in one successive operation by rounding rollers following immediately after the profiling tools.

The particular feature of this invention, however, consists in employing upper welding rollers $d, c$, separate from each other and following each other, while, hitherto, one single welding roller has been employed to perform the welding operation on both sides of the rim. The lower rollers $d, c$, of each pair might be stationary, while the two upper rollers $d, c$ must be carried in a manner to be able to press independently from each other against the two flanges of the strip $a$.

For this purpose, the said upper rollers $d, c$, may be carried within the connecting lash or plate $i$ in a manner to allow of a slight turning movement. The said lash or plate $i$ is carried by the frame $k, k$, and adapted to slide in the vertical direction, but by rounding off the edges at its ends it obtains the possibility to take an oblique position by slightly turning.

The current is supplied separately to the two welding rollers, but it may as well be simultaneously supplied to them, as indicated at $m$ in the drawings.

The pressure for performing the welding operation may be derived from the proper weight of the rollers, or it may be given through any suitable means of supplying pressure.

Owing to the fact that the two upper welding rollers $d, c$, take a position independent of each other, it will be impossible, that the pressure of one of the two rollers against the welding strip is lessened or prohibited, if the other roller happens to bear against a thicker portion. The pressure will always be uniformly distributed, and, in consequence, the welding heat applied to both sides of the rim will be always the same.

I claim as my invention:

1. An improved method of electrically welding the flanges of wheel tires, consisting in welding both sides of the rim separately, substantially as and for the purpose described.

2. An improved method of electrically welding the flanges of wheel tires, consisting in employing separate rolling welding tools for the two flanges, said tools arranged to weld both sides of the rim separately and working their pressure independently from each other and following each other in their working operation, substantially as and for the purpose described.

3. An improved method of welding the flanges of wheel tires, consisting in performing the welding and the profiling operations of the strip in one continuous operation, the welding being done first upon both sides of the rim separately and the profiling immediately subsequent, substantially as and for the purpose set forth.

4. An improved method of manufacturing the flanges of wheel tires, consisting in performing the welding, the profiling and the rounding operations of the strip in one continuous train of working, the welding being done first upon both sides of the rim separately, then the profiling and last the rounding by tools immediately following each other, substantially as and for the purpose set forth.

5. Improvement in apparatus for manufacturing wheel tires, comprising corrugated guide-rollers for feeding the metal strips, electrical welding rollers for welding the strip on one side of the rim, electrical welding rollers for welding the strip on the opposite side of the rim, rollers for profiling the tire and rollers for rounding the tire, substantially as and for the purpose set forth.

In testimony whereof I affix my signature in the presence of two witnesses.

RUDOLF KRONENBERG.

Witnesses:
M. KENSKINZ,
R. DE GALZUSTA.

Copies of this patent may be obtained for five cents each, by addressing the "Commissioner of Patents, Washington, D. C."